(12) United States Patent
Gahner

(10) Patent No.: US 10,666,782 B2
(45) Date of Patent: May 26, 2020

(54) METHOD AND APPARATUS FOR IMPROVING A VOICE QUALITY OF A COMMUNICATION DEVICE COUPLED TO A VEHICLE

(71) Applicant: AUDI AG, Ingolstadt (DE)

(72) Inventor: Enrico Gahner, Vohburg a.D. (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 16/324,222

(22) PCT Filed: Jun. 27, 2017

(86) PCT No.: PCT/EP2017/065826
§ 371 (c)(1),
(2) Date: Apr. 10, 2019

(87) PCT Pub. No.: WO2018/028871
PCT Pub. Date: Feb. 15, 2018

(65) Prior Publication Data
US 2020/0028953 A1    Jan. 23, 2020

(30) Foreign Application Priority Data
Aug. 10, 2016  (DE) .................. 10 2016 214 853

(51) Int. Cl.
*H04M 1/24* (2006.01)
*H04W 4/48* (2018.01)
(Continued)

(52) U.S. Cl.
CPC .......... *H04M 1/24* (2013.01); *H04M 1/6091* (2013.01); *H04W 4/44* (2018.02); *H04W 4/48* (2018.02); *H04W 4/80* (2018.02)

(58) Field of Classification Search
CPC ....... H04M 1/24; H04M 1/6091; H04W 4/44; H04W 4/48; H04W 4/80
(Continued)

(56) References Cited

U.S. PATENT DOCUMENTS 7,299,076 B2   11/2007 Dunn, Jr. et al.
8,401,489 B2    3/2013 Schmidt et al.
(Continued)

FOREIGN PATENT DOCUMENTS

CN        1819477 A    8/2006
CN      101478587 A    7/2009
(Continued)

OTHER PUBLICATIONS

International Search Report and Written Opinion of the International Search Authority directed to related International Patent Application No. PCT/EP2017/065826, dated Sep. 22, 2017, with attached English-language translation; 22 pages.
(Continued)

*Primary Examiner* — Eugene Yun
(74) *Attorney, Agent, or Firm* — Sterne, Kessler, Goldstein & Fox P.L.L.C.

(57) ABSTRACT

An embodiment relates to a computing device for determining a signal quality of a communications connection, wherein the computing device is configured to receive a first signal of a test sequence of a first communications device and a second signal of a test sequence of a second communications device connected to the first communications device and comprised in a vehicle, and wherein the computing device is configured to determine at least one signal quality parameter of the first signal and of the second signal, respectively, and to determine settings and/or signal processing methods for a hands-free device of the vehicle on the basis of a comparison of at least one signal quality parameter
(Continued)

of the respective first and second signals, whereby a signal quality of a signal to be transmitted by the first communications device to an external communications device is improved.

19 Claims, 1 Drawing Sheet

(51) Int. Cl.
  *H04W 4/44* (2018.01)
  *H04W 4/80* (2018.01)
  *H04M 1/60* (2006.01)

(58) Field of Classification Search
  USPC ...................................................... 455/41.2
  See application file for complete search history.

(56) References Cited

U.S. PATENT DOCUMENTS

| | | |
|---|---|---|
| 2011/0064232 A1 | 3/2011 | Ruwisch |
| 2012/0094657 A1 | 4/2012 | Gullapalli et al. |
| 2015/0350398 A1 | 12/2015 | Joshi et al. |

FOREIGN PATENT DOCUMENTS

| | | |
|---|---|---|
| EP | 1583265 A1 | 10/2005 |
| EP | 1883213 A1 | 1/2008 |
| EP | 2031846 A1 | 3/2009 |

OTHER PUBLICATIONS

International Preliminary Report on Patentability of the International Search Authority directed to related International Patent Application No. PCT/EP2017/065826, dated Feb. 12, 2019, with attached English-language translation; 16 pages.

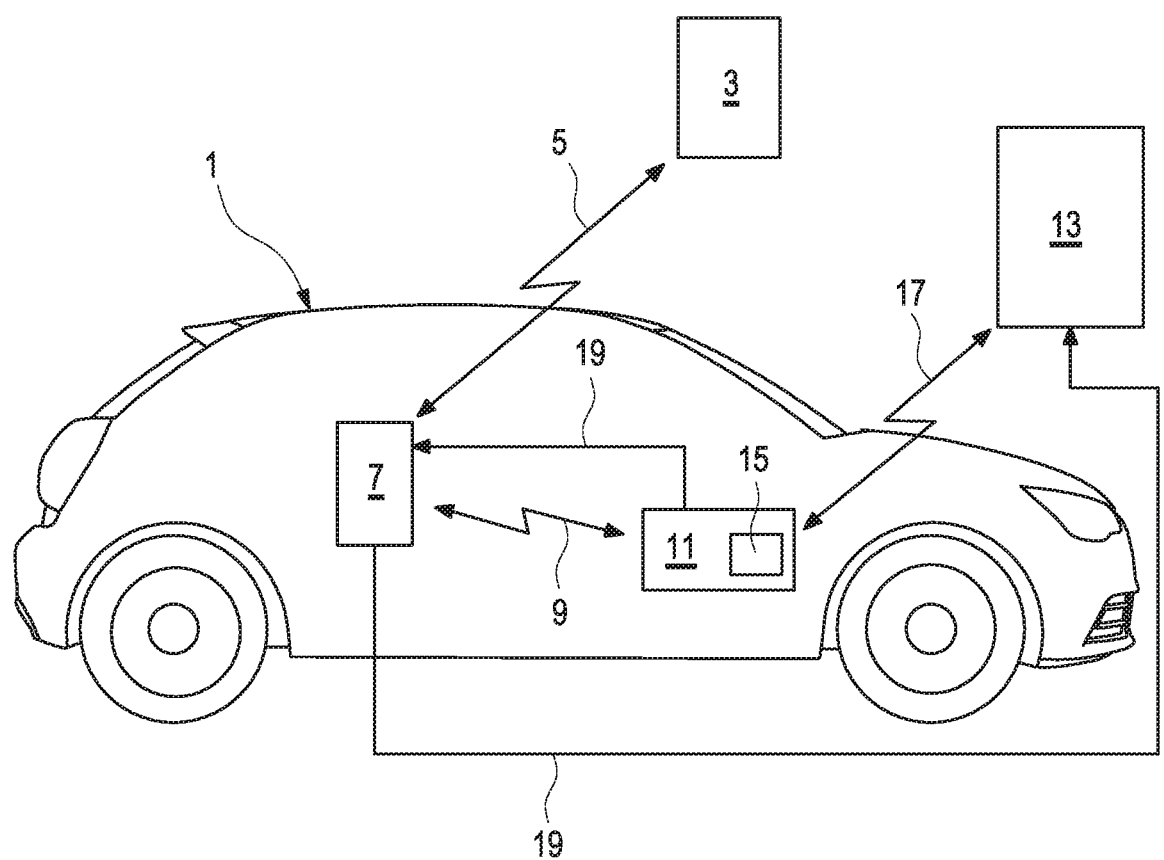

METHOD AND APPARATUS FOR IMPROVING A VOICE QUALITY OF A COMMUNICATION DEVICE COUPLED TO A VEHICLE

TECHNICAL FIELD

An embodiment relates to a method for controlling the voice quality of a communications connection between a first communications device linked to a vehicle and a second external communications device. A further embodiment relates to a computing device configured to execute the presented method.

BACKGROUND

When using a communications device linked to a vehicle via a connection such as a Bluetooth connection, impaired quality occurs regarding a voice quality of a connection to an external communications device connected to the vehicle, which may be due to settings of the communications device, which are optimized for uncoupled communications.

European document EP 203 18 46 A1 discloses a method for calibrating a hands-free device in a vehicle, in which a test signal to be generated by the hands-free device is compared against a predefined signal.

European document EP 188 32 13 A1 presents a method for calibrating a hands-free device, in which a test signal is alternatingly transmitted between the hands-free device and a terminal, and in which a respective received test signal is used for a comparison against a respective stored test signal.

Document EP 1 583 265 A1 discloses a method for calibrating an arrangement with a transmitter and a receiver, in which the receiver and the transmitter are switched into a test mode wherein signal parameters of a transmission signal are measured and used for calibration purposes.

SUMMARY

Given this background, a method is presented for controlling a voice quality of a communications connection between a first communications device linked to a vehicle and a second external communications device, in which the communications connection is controlled using the following steps:

a) Transmitting a test sequence, played by an audio playback device included as part of the vehicle, to a server, using a vehicular communications device included as part of the vehicle;

b) The server determining at least one signal quality parameter of a signal encoding the test sequence transmitted by the vehicular communications device;

c) Transmitting the test sequence played by the vehicle's audio playback device to the server using the first communications device;

d) The server determining at least one signal quality parameter of a signal encoding the test sequence transmitted by the first communications device;

e) The server comparing at least one signal quality parameter of the signal encoding the test sequence transmitted by the vehicular communications device against at least one signal quality parameter of the signal encoding the test sequence transmitted by the first communications device;

f) Determining settings and/or signal processing methods for a hands-free device that is part of the vehicle, wherein the settings and/or signal processing methods are selected on the basis of signal quality parameters of the test sequence transmitted by the vehicular communications device and the test sequence transmitted by the first communications device and/or on the basis of differences determined between the signal quality parameters of the test sequence transmitted by the vehicular communications device and the signal quality parameters of the test sequence transmitted by the first communications device, to improve a voice quality of a signal transmitted by the first communications device to the second communications device, and/or a signal to be played back by the hands-free device;

g) Transmitting the determined settings and/or signal processing methods to the vehicle;

h) Adjusting the settings and/or signal processing methods on the vehicle's hands-free device.

A plurality of embodiments emerge from the present disclosure.

The presented method is used in particular for optimizing a voice connection between a communications device, such as, e.g., a mobile phone, linked to a vehicle's hands-free device via a wireless connection, and an external communications device. Since mobile phones generally execute signal-processing methods on voice signals independent of a respective linked hands-free device, signal processing methods that are used to optimize a signal used for communication purposes by a vehicular communications device comprised within the hands-free device either cannot be implemented or are implemented to an insufficient degree to optimize the voice signal. The voice signal is generated by the communications device linked to the hands-free device, which means that a voice quality generated when using the hands-free device, when linked to a respective mobile phone communications device via a wireless connection, lags behind a voice quality achieved by using the hands free device with the vehicular communications device comprised within the hands-free device, wherein this vehicular communications device is the vehicle's own communications module.

To detect current settings and signal processing methods of a communications device linked to a respective hands-free device of a vehicle and to configure the hands-free device in such a manner that, despite the existing settings and signal processing methods of the communications device, the hands-free device can be used to process a voice signal to be generated by the communications device linked to the hands-free device and optimize the voice quality of said voice signal, it is provided that these settings and signal processing methods, which are activated when the communications device is linked to the hands-free device, are determined by means of a test sequence. To determine the settings and signal processing methods, it is provided that a test sequence, which consists for example of a frequency sequence between 20 Hz and 20000 Hz, is played by an audio source in the vehicle, received or recorded by the hands-free device, and transmitted via a vehicular communications device, such as a GSM module, comprised within the hands-free device, to a server. Furthermore, it is provided that the test sequence, which is possibly reproduced again, is received or recorded by the communications device linked to the hands-free device and is transmitted directly to the server by the communications device linked to the hands-free device.

By means of the test sequence transmitted by the vehicular communications device, and the test sequence transmitted by the communications device linked to the hands-free device, it is possible for a server receiving both the transmitted test sequences to evaluate the quality of signals transmitted by the vehicular communications device, and the communications device linked to the hands-free device, respectively. To do so, the server evaluates signal quality parameters, such as signal-to-noise ratio, frequency response or variance of a signal level, where said server determines their values. By means of these signal quality parameters, the server can establish which settings and/or signal processing methods are currently activated on the communications device linked to the hands-free device, and which settings and/or signal processing methods are required, to raise the signal being generated by the hands-free device to achieve a level of quality of the signal generated by the vehicular communications device.

In addition to analyzing the signal transmitted by the communications device linked to the hands-free device, the server can also analyze the signal transmitted by the communications device comprised within the hands-free device, and evaluate it using at least one signal quality parameter, in terms of respective settings and/or signal processing methods used by the hands-free device. To do so, the server can compare, for example, respectively determined values of signal parameters or signal processing methods against corresponding reference values.

By comparing respective signal quality parameters of the signal, which was transmitted to the server by the communications device linked to the hands-free device, and the signal, which was transmitted by the communications device comprised within the hands-free device, the server can determine adjustments and/or signal processing methods by which the hands-free device can optimize the signal, particularly in regard to voice quality, generated by the communications device linked to the hands-free device. For example, the server can determine adjustments by means of which an active volume control or signal smoothing is executed and/or a transmission level is set.

Respective settings and/or signal processing methods, which are determined by the server and are executed by the hands-free device on the signal provided by the communications device linked to the hands-free device, are transmitted by the server to the hands-free device and used by the hands-free device to process the signal. This means that the hands-free device optimizes the signal received by the communications device linked to the hands-free device via a Bluetooth connection for example, as a function of the settings and/or signal processing methods determined by the server, and, as a result, compensates for respective signal processing methods, which are executed by the communications device alone, when linked to the hands-free device, and result in a poor voice quality when the signal is outputted or received by means of the hands-free device.

Within the context of the presented method, a vehicular communications device refers to a communications module, such as a GSM, 3G or LTE module, which is permanently installed in a vehicle and is controlled by a vehicle-side computing unit. A vehicular communications device is part of a hands-free device, which receives a voice signal provided by the vehicle user and reproduces respective voice signals provided by an external communications partner via a speaker system. A hands-free device can be supplied with voice signal, i.e., a voice-encoding signal, by a vehicular communications device or a communications device linked to such a hands-free device, such as a mobile phone. Furthermore, a voice sequence recorded by a microphone, for example, can be converted by the hands-free device into a voice signal, and can be transmitted by means of the vehicular communications device, comprised within the hands-free device, or by a communications device linked to the hands-free device, to an external communications partner.

A possible design of the presented method provides that the method may be activated by a user, by an automatic procedure, or by an external communications partner connected to the vehicle's own communications device or the first communications device.

To activate the presented method and improve a voice quality of a voice signal used in a hands-free device in a vehicle, wherein the method is activated by a user of said hands-free device, it may be provided that the presented method can be activated on user-demand, e.g., given subjectively perceived voice quality problems by the user or the external communications partner communicating with the user. Obviously, it is also conceivable that the presented method is activated automatically, for example when detecting a voice signal quality parameter, such as a level, when it fluctuates at a variance that is greater than a predefined threshold value. A corresponding control command to activate the presented method may also be provided by any external communications partner of a respective communications arrangement or a respective used mobile communications network.

Another possible design of the presented method provides that a signal parameter from the following list of signal quality parameters is selected as the at least one signal quality parameter: signal fluctuations, level fluctuations, frequency response and voice quality.

To determine settings and/or signal processing methods used by the communications device linked to the hands-free device, any technically suitable quality parameter may be used to evaluate a communications signal.

Another possible design of the presented method provides that the settings on the vehicular communications device are settings for signal processing, which result in an improved signal in relation to at least one signal parameter of the following list of signal parameters: downlink, levels, variances, voice quality and frequency response.

Another possible design of the presented method provides that a test sequence is transmitted by the server to the vehicular communications device, and the vehicular communications device is adjusted as a function of a signal quality of a signal encoding the test sequence transmitted by the server to the vehicular communications device.

In addition to optimizing settings and/or signal processing methods to improve a signal quality of a signal, which is transmitted by a respective hands-free device to an external communications partner, the presented method can also be used to optimize reproduction of a signal provided by such an external communications partner. To do so, it is provided that the external communications partner, an external communications device such as a server or a mobile phone for example, transmits a test sequence to the hands-free device and the hands-free device analyzes a corresponding signal with regard to the aforementioned respective signal quality parameters and compares them against a specified reference for example to infer respective adjustments to be made and/or respective signal processing methods to be activated, and activate them correspondingly on the hands-free device. The adjustments to be made on the hands-free device may thereby comprise control commands for example, which undo or neutralize, amplify, weaken or optimize signal processing methods used by a respective external communications device linked to the hands-free device.

Another possible design of the presented method provides that when a first communications device is used, a first communications device-type is determined and a profile is created, using the respective adjustments to be made on the hands-free device of the vehicle and/or using the respective values of signal quality parameters of the signal encoding the test sequence transmitted by the first communications device, wherein said profile is stored in a memory for subsequently adjusting the respective hands-free device when linked to a communications device of the type of the first communications device without test sequences being previously transmitted. The values of the signal quality parameters for such a device-type may thereby be subjected to an individual weighting, in which an influence of selected values is increased in relation to other values in determining corresponding adjustments.

By determining a type of a respective communications device linked to a hands-free device, for example by the hands-free device reading type information or a server communicating with the communications device, a profile belonging to the communications device can be generated, in which information about signal properties, i.e., particularly about respective detected settings and/or signal processing methods, which were determined by means of the respective values of signal quality parameters, is stored and used, for example, to generate a setting and/or signal processing method for a hands-free device linked to such a communications device. By means of a profile of a respective communications device, respective hands-free device settings that are suited for such a respective communications device-type when linked to a hands-free device can be found in a correspondingly quick manner and possibly without analyzing test sequences beforehand. To that end, the hands-free device may comprise a database for example, in which respective settings and/or signal processing methods are stored for a number of communication device-types.

Another possible design of the presented method provides that by means of the settings stored in the memory and/or the values of the signal quality parameters, a quality of a respective mobile communications network used by the first communications device is assessed.

Using information stored in a profile via settings and/or signal processing methods, which are used by a respective communications device, properties of a respective signal sent by the communications device, which are based on settings and/or signal processing methods of the communications device, can be detected. Accordingly, a portion of changed signal properties, based on an influence of a respective used mobile communications network, can be detected, and can be used to assess a quality of a mobile communications network. As soon as the influence of a respective communications device on a signal is known, corresponding signal properties can be allocated to the communications device so that all additional properties, i.e., all signal changes in relation to a reference, must then be based on a respective utilized mobile communications network.

Furthermore, an embodiment relates to a computing device for determining a signal quality of a communications link, wherein the computing device is configured to receive a first signal having a test sequence of a first communications device and a second signal having a test sequence of a second communications device connected to the first communications device and comprised in a vehicle, and wherein the computing device is also configured to determine at least one signal quality parameter of the first signal and the second signal, respectively, on the basis of a comparison of at least one signal quality parameter of the respective first and second signals to determine settings and/or signal processing methods for a hands-free device of the vehicle, by means of which a signal quality of a signal to be transmitted by the first communications device to an external communications device is to be improved, wherein the computing device transmits the settings and/or signal processing methods to the hands-free device of the vehicle.

The presented computing unit is used in particular to execute the presented method.

Additional advantages and designs emerge from the description and the attached drawing.

It is clear that the precedingly mentioned features and those still to be explained below can be used not only in the respective combination indicated, but also alone or in other combinations, without departing from the scope of the present invention.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

FIG. 1 depicts a schematic illustration of the presented method.

DETAILED DESCRIPTION

FIG. 1 depicts a vehicle 1. Vehicle 1 is in contact with an external communications device 3 via a communications link. To do so, a first communications device 7 is linked via a Bluetooth connection 9 to a hands-free device 11 of vehicle 1.

Hands-free device 11 records the spoken language of a user of vehicle 1 by means of a microphone, transmits a corresponding voice signal via Bluetooth connection 9 to first communications device 7, which in turn transmits the voice signal to external communications device 3 or receives voice signals from external communications device 3, as indicated by arrow 5, and transmits said signals via Bluetooth connection 9 to hands-free device 11.

Normally, communications device 7 is configured to process ingoing and outgoing voice signals in such a manner that they are to be reproduced with optimal voice quality on the communications device 7. To process respective incoming and outgoing voice signals to first communications device 7 in such a manner that they are to be reproduced with optimal voice quality by hands-free device 11 or external communications device 3, it is provided that hands-free device 11 is calibrated. To calibrate hands-free device 11, hands-free device 11 plays a test sequence via a loudspeaker for example, records it via a microphone, and transmits a corresponding test signal to a server 13 via a second communications device 15 comprised by hands-free device 11, as indicated by arrow 17.

Furthermore, hands-free device 11 transmits the test signal via a first communications device 7 to server 13, as indicated by arrows 19.

Server 13 determines properties of the test signal transmitted by second communications device 15. To do so, server 13 collects values of signal quality parameters, such as a signal-to-noise ratio or a variance of the level trend, and based on the values, makes an inference in regard to current settings of hands-free device 11. Server 13 also determines properties of the test signal transmitted by first communications device 7. To do so, server 13 collects, in a manner analogous to the procedure regarding the test signal transmitted by second communications device 15, values of signal quality parameters, such as a signal-to-noise ratio or a variance of a level trend of the test signal transmitted by first communications device 7, and based on corresponding values, makes an inference in regard to current settings and/or currently activated signal processing methods of first communications device 7.

To optimize a signal to be generated by first communications device 7 and adapt it for example to a quality of a signal generated by second communications device 15, it is provided that server 13 compares the values of the signal quality parameters of the test signal of second communications device 15 against the values of the signal quality parameters of the test signal of first communications device 7, and determines adjustments and/or signal processing methods, which can be used to improve the quality of the signal to be generated by first communications device 7. The settings and/or signal processing methods determined by server 13 are transmitted to hands-free device 11, as indicated by arrow 17. Hands-free device 11 executes preliminary processing on a respective signal to be transmitted, where said signal for example encodes a recorded voice message of a user, by hands-free device 11, according to the settings and/or signal processing methods transmitted by server 13, in a vehicle-internal signal processing step, and then transmits the pre-processed signal to first communications device 7 via Bluetooth connection 9. First communications device 7 processes the signal preprocessed by hands-free device 11, and then transmits the optimized signal to external communications device 3, as indicated by arrow 5.

To optimize the voice quality of a signal received by communications device 7 for reproduction by the hands-free device, the hands-free device can be adjusted on the basis of settings and/or signal processing methods, which are determined in a comparison of a signal transmitted by server 13 to hands-free device 11, and a reference value.

The invention claimed is:

1. A method for controlling a voice quality of a communications connection between a first communications device linked to a vehicle and a second communications device, the method comprising:
   transmitting, using the second communications device, a test sequence to a server, the test sequence being played using an audio playback device comprised within the vehicle, wherein the second communications device is comprised within a hands-free device, wherein the hands-free device is comprised within the vehicle;
   determining, by the server, a signal quality parameter of a first signal encoding the test sequence transmitted using the second communications device;
   transmitting, using the first communications device, the test sequence to the server;
   determining, by the server, a signal quality parameter of a second signal encoding the test sequence transmitted using the first communications device;
   comparing, using the server, the signal quality parameter of the first signal encoding the test sequence transmitted by the second communications device with the signal quality parameter of the second signal encoding the test sequence transmitted by the first communications device;
   based on the comparison, determining settings or signal processing methods for the hands-free device, to improve a voice quality of a signal to be sent by the first communications device to the second communications device or to improve a signal to be reproduced by the hands-free device;
   transmitting, to the vehicle, the determined settings or signal processing methods for the hands-free device of the vehicle;
   detecting a device-type of the first communications device;
   generating a profile corresponding to the device-type of the first communications device, wherein the generated profile comprises at least one of the determined settings and a value of a signal quality parameter to be adjusted automatically on the hands-free device of the vehicle in response to a communication device of the device-type of the first communication device being linked to the hands-free device of the vehicle; and
   adjusting the transmitted settings or signal processing methods on the hands-free device of the vehicle.

2. The method of claim 1, wherein the test sequence to be transmitted by the first communications device, and the test sequence to be transmitted by the vehicular communications device, respectively, are played by the audio playback device at different points in time.

3. The method of claim 1, wherein the method is activated either by an autonomous procedure without user-intervention, by a user, or by an external communications partner connected to the vehicular communications device or the first communications device.

4. The method of claim 3, wherein the external communications partner is the server or a mobile phone.

5. The method of claim 1, wherein the signal quality parameter of the first signal or the signal quality parameter of the second signal is selected from: signal fluctuations, level fluctuations, frequency response and voice quality.

6. The method of claim 5, wherein the signal quality parameter of the first signal and the signal quality parameter of the second signal are the same.

7. The method of claim 1, wherein a wave signal having a specified frequency sequence between 20 Hz and 20,000 Hz is selected as the test sequence.

8. The method of claim 1, wherein the settings and/or signal processing methods determined for the hands-free device of the vehicle are settings and/or signal processing methods for signal processing, which result in an improved signal transmitted from the first communications device to the second communications device, and/or an improved signal reproduced by the hands-free device of the vehicle, in relation to at least one signal parameter of the following list of signal parameters: downlink, levels, variances, voice quality and frequency response.

9. The method of claim 1, wherein the test sequence is transmitted by the server to the vehicular communications device and the hands-free device is adjusted as a function of a signal quality of a signal encoding the test sequence transmitted by the server to the vehicle's own communications device.

10. The method of claim 1, wherein the profile is stored in a memory of a vehicle-side computing unit.

11. The method of claim 1, wherein the value of the signal quality parameter corresponding to the first communications device-type is subjected to an individual weighting.

12. The method of claim 1, in which the settings stored in the memory or the value of the signal quality parameter, which are changed due to an influence of a respectively used mobile communications network, by the device-type of the first communications device, are utilized to assess a quality of the respective mobile communications network used by the first communications device.

13. The method of claim 12, wherein signal properties corresponding to the mobile communications network can be allocated to the first communications device so that all additional properties must be based on the respectively used mobile communications network.

14. A computing device for determining a signal quality of a communications connection, wherein the computing device is configured to:
 receive a first signal of a test sequence of a first communications device, and a second signal of a test sequence of a second communications device connected to the first communications device comprised within a vehicle, wherein the second communications device is comprised within a hands-free device, and wherein the hands-free device is comprised within the vehicle;
 determine at least one signal quality parameter of the first signal and of the second signal;
 determine settings and/or signal processing methods for a hands-free device of the vehicle on the basis of a comparison of the determined at least one signal quality parameter of the respective first and second signals;
 transmit the settings and/or signal processing methods to the hands-free device of the vehicle, whereby a signal quality of a signal to be transmitted by the first communications device to an external communications device is improved;
 detect a device-type of the first communications device; and
 generate a profile corresponding to the device-type of the first communications device, wherein the generated profile comprises at least one of the settings and a value of a signal quality parameter to be adjusted automatically on the hands-free device of the vehicle in response to a communication device of the device-type of the first communications device being linked to the hands-free device of the vehicle.

15. The computing device of claim 14, wherein when the computing device receives the first signal of the test sequence from the first communications device, or the second signal of the test sequence of the second communications device, the computing device is programmed to collect values of signal quality parameters relative to the first or second signals.

16. The computing device of claim 15, wherein the signal quality parameters are signal-to-noise ratio or variance of a level trend.

17. The computing device of claim 16, wherein when receiving the first signal of the test sequence of the first communications device, and the second signal of the test sequence of the second communications device, the computing device is programmed to compare the values of the signal quality parameters of the first signal with the second signal, wherein the settings for the hands-free device of the vehicle are based upon said comparison.

18. The computing device of claim 17, wherein in determining the settings for the hands-free device of the vehicle, the computing device is programmed to optimize the first signal generated by the first communications device to a level of quality of the second signal generated by the second communications device based upon said comparison of signal quality parameters.

19. The computing device of claim 17, wherein the computing device is a vehicle-side computing device.

* * * * *